Aug. 18, 1964
G. TRUPP ETAL
3,144,867
DENTAL PROPHYLACTIC
Filed Aug. 24, 1962
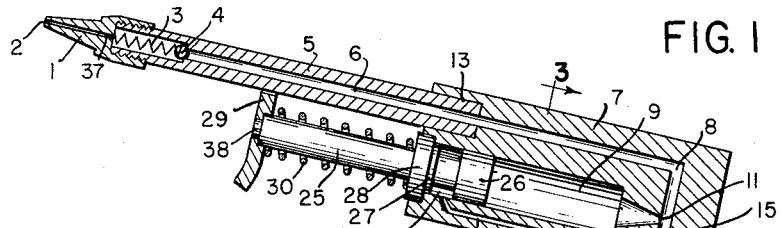
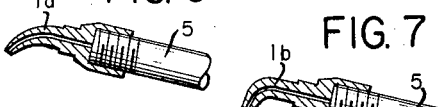
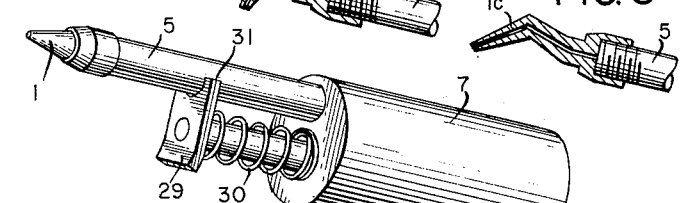
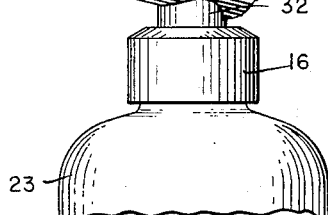
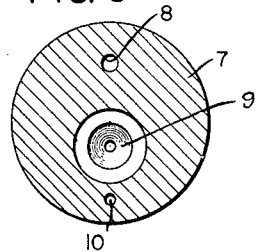
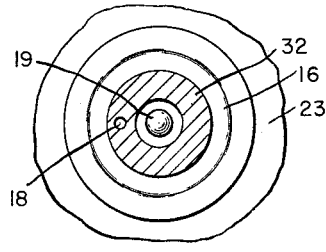
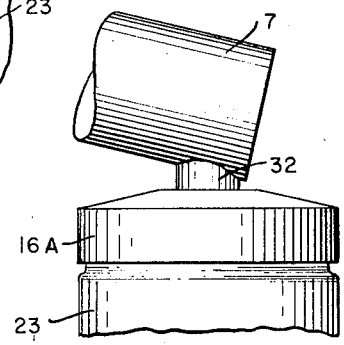
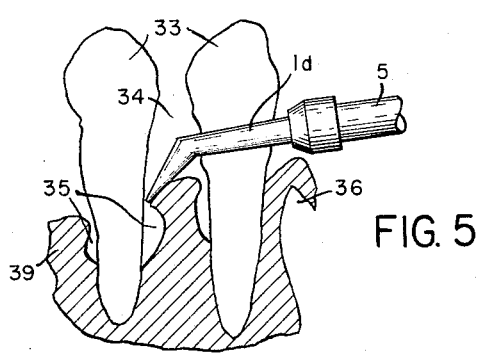
INVENTOR
GARRISON TRUPP
BERNARD TRUPP
BY *Sherman Levy* — ATTORNEY

United States Patent Office 3,144,867
Patented Aug. 18, 1964

3,144,867
DENTAL PROPHYLACTIC
Garrison Trupp, 4600 York Road, and Bernard Trupp, 3900 N. Charles St., both of Baltimore, Md.
Filed Aug. 24, 1962, Ser. No. 219,221
4 Claims. (Cl. 128—234)

This invention relates to a dental and oral prophylactic dispensing apparatus device for home or clinical use with proprietary or ethical drugs, oxygenating agents, chemicals, antibiotics, agents, antiseptic solutions, mouth washes and rinses, which are directed under manually primed pressure through and into oral areas which are normally difficult to reach except by doctor, dentist or professional hygienist.

This invention is an improvement over such existing devices and methods including, but not by limitation, toothbrushes, toothpicks, dental tape, ribbon or floss, chewing gums, rubber tips, gargling, rinsing, and brushing.

The principal object is to provide a convenient method, procedure, and apparatus device for home care oral hygiene and treatment which is normally available only through professional services in the doctor's or dentist's office.

This device's adaptability and portable hand operation provide new and desirable features not now existing for individual home care of the mouth, throat, and interdental space.

Other objectives and advantages of the invention and method are more fully covered in the following description and accompanying drawings.

Interdent introduces a significant improvement in proper oral hygiene and in the treatment and protection against periodontal disease.

The most ignored, yet the most important area of your mouth is the interdental or interproximal space, the inbetween areas of your teeth. It is in this harbor area that mouth debris, bacteria, materia-alba, soft epitheleal and necrotic matter with attended circulatory stagnation cause atrophic periodontal change.

Interdent places an ethical and proprietary drug in the interdental space—that area betwen the teeth where breakdown changes result in mouth disease.

Through chemical and mechanical action, Interdent removes debris, bacteria, meal residue, materia-alba, epitheleal matter, and necrotic accretions. It flushes shallow and deep periodontal pockets. It prevents stagnation in circulatory vessels by giving normal massage to the periodontal tissues, prescribed by dentists.

This breakdown condition exists in the mouths of many children and nearly every adult. Failure to cope with this condition results in gum diseases and mouth disorders.

Interdent may be used for home and clinical care in mouth hygiene and treatment of periodontal disease.

Interdent and Interdental Points are made of rigid or flexible plastic, metal, rubber, and synthetic materials.

Interdent and Interdental Points are used to introduce aqueous and aqueous-like solutions into and thru the interproximal spaces of the teeth to lavage the periodontium and surrounding tissue structure.

The movement of these solutions removes debris bacteria, food impactions, food particles, meal residue, materia-alba, soft epitheleal matter, loose accretions. It flushes shallow and deep periodontal pockets. It prevents stagnation in circulating vessels and gives normal massage and stimulation to the periodontal tissues. It places ethical and proprietary drug solutions in hard to reach areas of the periodontium.

Interdent and Interdental Points are used in connection with water outlet faucets, pump containers, plastic containers, and bottles, compressible plastic, rubber, and synthetic type containers, pressure containers, hydraulic containers. The outlets and various containers by means of various pressures, electrical, mechanical, physical or natural, move the aqueous solution into and through the interdental point into the interproximal spaces of the teeth.

Use of Interdent and Interdental Points are designed to promote healing and maintenance of health of the periodontium by the debridement and circulatory stimulation of the periodontium.

The use of Interdent and Interdental Points is a major procedure in the elimination of many of the contributing factors to the incidence of periodontal disease.

(1) It eliminates damage caused to the periodontium in the injudicious use of toothpicks, dental floss, and dental tape. Interdental Points are superlative in cleansing effect with little chance of ever damaging the periodontal tissues.

(2) It will remove particles and debris from areas inaccessible to the toothhrush. It washes away debris and accumulations of long standing. It should be used each and every day after each and every meal to dislodge and remove residual meal particles.

(3) It assures gentle and effective cleansing and promotes the health of the periodontium by stimulating the reparative processes and thereby assists in the reconstruction of the periodontium.

(4) The Points find access to all oral areas without trauma or tissue laceration. The Interdental Points are designed to reach all areas of the natural teeth, and around, between, and under fixed prosthetics, crown, and bridge restorations.

(5) It can be used under medical instruction and supervision for lavage of operative area in extraction and oral surgery, for use in the treatment of suppurative periodontoclasia, necrotic gingivitis, pericementitis, perconitis, abscess, and fistula, for use in placement of oxygenating agents, antiseptics, germicides, and other drug agents into and through the interdental spaces.

(6) Its use prevents a lethargic (stagnant) state in the tissues and prevents an accumulation of waste material interdentally.

(7) Its use in exercising the interdental tissue may prevent or delay periodontal atrophic changes. Its use serves as a circulatory stimulator to the periodontium and the underlying supporting bone of a tooth.

(8) Its use in cleaning the free gingiva can prevent the initiating of periodontal disease and thus may prevent acute and chronic inflammation starting in the marginal gingiva and extending to deeper structures.

Interdent and Interdental Points should become an absolute for proper oral hygiene. In spite of best home care, however, nearly every adult and many children are subject to some deposition of calculus. This can only be removed by the dentist. Maintenance of health of the periodontium therefore requires in addition to proper home care, regular professional propylaxis.

Interdent and Interdental Points are designed for attachment to plumbing fixtures as standard equipment in all new bathroom plumbing—and the adaptation to older plumbing.

The Interdent Prophylactic is made of materials that will resist destructive action by drugs, solutions, and chemicals. It can be made of rigid or flexible plastic, metal, glass, rubber, or synthetic materials. The individual parts can be fabricated, formed, fashioned, machined, or cast.

The accompanying drawings illustrate a preferred embodiment of this invention, and similar figure and reference numerals refer to similar features and views as follows:

FIG. 1 is a longitudinal section of the Interdental prophylactic device showing course of liquid or solution, reciprocal piston pump and discharge system arrangement, and adaption closure for standard or custom bottles or containers.

FIG. 2 is a perspective view of the present invention.

FIG. 3 is a sectional view taken on the line 3—3 of FIG. 1.

FIG. 4 is a sectional view taken on the line 4—4 of FIG. 1.

FIG. 5 is a fragmentary elevational view showing the interdental point or nozzle being used to cleanse or treat the interdental gingiva, teeth and gum structure and incidence of periodontal pockets.

FIGS. 6, 7 and 8 are fragmentary sectional views showing different types of interdental points or nozzles.

FIG. 9 is a fragmentary view showing how the present invention can be adapted to existing or custom made containers.

*Special Notes on Construction Detail*

The arrangement of the piston 26 and compression chamber 9 suction tube 21, discharge passage 8–6–2 to point and retro-drainage passage 12–10–20–17–18 are efficiently placed to provide trouble-free service and practical construction and fabrication.

In use the Interdent Prophylactic provides intermittent or continuous discharge as desired by reason of reciprocal pump system. Pressure of the index or middle finger upon trigger 29 while the Interdent Prophylactic and attached container is held between thumb and palm of hand, comprises the method of operation.

Individually designed points 1a–1b–1c–1d for special and prescribed conditions provide a clinical and specialized use by dentist or professional dentist hygienist.

Compression spring 30 is placed on outside of piston chamber to keep drugs, rinses, solutions, antiseptics, free of chemical or metallic action when interdent is not in use.

Finger rest trigger 29 attached to external end of piston rod is designed to move back and forth without twist or turning by the extension of finger rest guide 31 along the sides of the nozzle or point body 5.

Closure 16 is designed and secured to suction tube and sized so that Interdent Prophylactic may be conveniently adapted to standard, widely marketed mouth washes, rinses, and antiseptics.

Closure 16a is substantially for the same purpose as above, but for wide mouth containers which allow for mixing solutions to be used in Interdent Prophylactic.

*Reference Points*

(1) Interdental Points 1a–1b–1c–1d.
(2) Discharge Passage of Interdental Points.
(3) Light compression spring provides opening and closing of passage by ball check valve as trigger plunger is compressed and released.
(4) Ball check valve seat.
(5) Discharge tube.
(6) Discharge passage.
(7) Body housing compression chamber, piston plunger, intake suction passage, discharge passage and retro-drainage passage.
(8) Discharge passage to Interdental point.
(9) Compression chamber and piston housing.
(10) Drainage passage returns bypass retro fluids to container.
(11) Intake and discharge orifice of compression chamber.
(12) Orifice drainage passage.
(13) Body of discharge tube.
(14) Upper chamber of suction tube, houses ball-check valve and securely couples 7 body housing with container closure and suction tube. This tube coupling also conveys drainage from 12 and 10 back to container.
(15) Coupling bore.
(16) Closure—standard or custom thread.
(17) Forward wall of coupling tube provides passage for retro-fluid back to container.
(18) Orifice drainage discharge.
(19) Ball check.
(20) Drainage passage joins coupling tube passage for return of drainage to container.
(21) Suction tube wall.
(22) Suction tube passage.
(23) Container.
(24) Closure seal.
(25) Piston rod.
(26) Piston head.
(27) Internal collar and seal, recessed and fastened.
(28) External collar seal.
(29) Finger-rest-trigger.
(30) Compression spring fitted to external end of piston plunger rod.
(31) Finger rest—trigger guide slides back and forth against body of discharge tube to prevent twist or turn of trigger.
(32) Coupling tube or body piece for body housing and suction tube.
(33) Teeth.
(34) Interdental space.
(35) Periodontal pockets.
(36) Crestal alveolar process.
(37) Internal orifice of interdental point.
(38) Seat fastening for piston plunger rod.
(39) Periodontium.

To operate our Interdental Prophylactic, we remove the standard closure of a proprietary or ethical product and insert the Interdent Prophylactic suction tube 21 fastening the same as shown in FIG. 5.

The Interdental Prophylactic is held between the thumb and palm of hand and manually operated with the index or middle finger depressing and releasing plunger trigger 29 while directing liquid in oral areas as desired through nozzle and interdental point.

When the plunger is depressed and released sufficient suction is created to open ball valve 19 and draw fluid from container thru suction tube 22 into the compression chamber 9. When the trigger plunger 29 is depressed again ball check valve 19 is closed and fluid is forced upward through discharge passage 8–6–2. By repeated operation of trigger plunger intermittent or continuous discharge flow may be forced under such pressure as the individual may exert on the trigger. The discharge tube 5 is so mounted at an angle so that unexpelled fluid remaining in device settles away from spring 3 in the point assembly and yet remains primed and so that every successive stroke of the trigger plunger provides a continuous discharge flow as the trigger is depressed.

Our invention and illustrated arrangement of principal parts and sections may be embodied in other specific forms without departing from the spirit, characteristics or purpose, and method thereof as an interdental and oral prophylactic.

Having described embodiment of our invention, method and procedure which we claim as new and desire to protect by Letters Patent are:

1. A relatively small portable dental prophylactic device, comprising a tapered and pointed relatively long discharge tip of a size to fit into the interproximal spaces at all points of the dental arch, liquid supply means including a container of a size to fit in the hand of the user connected to said discharge tip for supplying a multiple of controlled discharges of liquid from the tip, and manually operable fluid pump means connected to the container for the intermittent and repeated discharge of liquid from said container in a multiple of controlled amounts in a jet stream through the discharge tip.

2. The structure as defined in claim 1 and further including a finger operated trigger for actuating said manually operable fluid pump means.

3. The structure as defined in claim 1 and further including a finger operated trigger for actuating said manually operable fluid pump means, and said pump means being spring actuated.

4. The structure as defined in claim 1 and further including a finger operated trigger for actuating said manually operable fluid pump means, in one direction, spring means for actuating said fluid pump means in a direction opposite said one direction, and valve means for controlling the flow of liquid through the device.

References Cited in the file of this patent

UNITED STATES PATENTS

| | | |
|---|---|---|
| 708,224 | Gundlach et al. | Sept. 2, 1902 |
| 1,164,430 | Thurman | Dec. 14, 1915 |
| 1,696,486 | Jeffreys | Dec. 25, 1928 |
| 1,961,489 | Hein | June 5, 1934 |
| 2,074,401 | Kauzal | Mar. 23, 1937 |
| 2,118,451 | Hansen | May 24, 1938 |
| 2,362,080 | Martin | Nov. 7, 1944 |
| 2,514,576 | Hein et al. | July 11, 1950 |
| 2,566,487 | Gora et al. | Sept. 4, 1951 |
| 2,710,711 | Hutton | June 14, 1955 |
| 2,753,578 | Lebet | July 10, 1956 |
| 2,829,645 | Matteson | Apr. 8, 1958 |
| 2,845,066 | Hoppe | July 29, 1958 |
| 3,061,202 | Tyler | Oct. 30, 1962 |

FOREIGN PATENTS

| | | |
|---|---|---|
| 22,557 | Australia | Sept. 20, 1929 |